6891X
S. Fitch.
Grain Fanning Mill.
Patented Jan. 6, 1832.
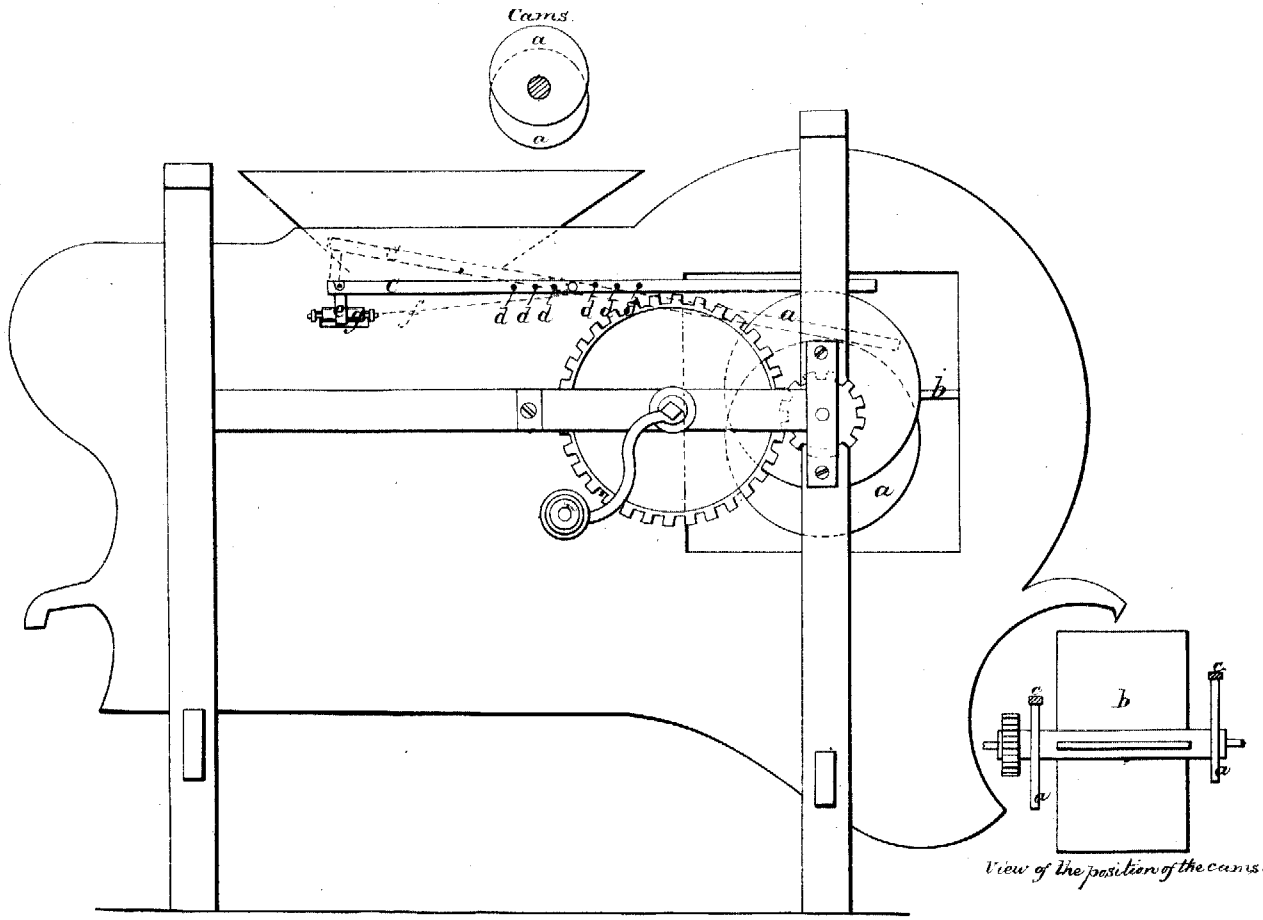

May 26. 1832

6891X Thomas French Ithica N.Y.

Letters Patent

The schedule referred to in these Letters Patent and making part of the same containing a description in the words of the said Thom-as French himself of his Improvement in the art of paper making called the [illegible] Machine.

Be it known that I Thomas French of the Village of Ithica County of Tompkins and State of New York have invented a new and use-ful Improvement in the art of manufacturing paper which I have designated by the name of the [illegible] Machine the use and object of which are to separate the knots & dirt from the pulp or stuff after the rags are ground & before the stuff passes from the reservoir which is denominated the Stuff Chest into the Vat from which it is moulded by hand or by machine into paper so as to obviate the necessity & labour of picking the sheets by hand after they have become dry as is now usually done in the process of finishing and that the following is a full and exact description of the machine as invented by me Viz.

A Cylinder 18 inches in Diameter and 14 inches high (represented in the annexed drawing) formed of sheet copper or brass from one eighth to one sixteenth of an inch thick with [illegible] (B B) [illegible] perpendicularly therein either in two or three directions as represented in the draft or [illegible] the whole length of the Cylinder except a rim around the top and bottom about 1/4 of an inch apart and about [illegible] of an inch wide so as to permit the fine pulp to escape & retain the knots and dirt within. The Cylinder is let into and fastened upon a bottom [illegible] and has a head or crowning [illegible] of wood. In instead of sheet copper or brass with the [illegible] cut therein as before described cast or wrought metal [illegible] may be used arranged in a cylindrical form or in a square or octagonal shape the requisite distance apart [illegible] the Cylinder [illegible] of brass or composition metal

6891X represented by (D) attached to a piston rod (B) and playing upon the
guiding rods (CC) which extend on each side of the piston rod through
holes in the arms of the dasher & are made fast to the bottom and top of
the box which encloses the Cylinder the piston rod is guided by a cross
piece (I) sliding on the guiding rods and joined to a connecting rod at a
joint (E) by which it is attached to a crank (A on the end of a shaft driven
by ordinary and appropriate machinery or gearing so as to give to the dash
er from four hundred to six hundred revolutions or strokes up and
down in each minute. –

By this rapid motion of the dasher the fine pulp
is forced thro' the crevices or bars in the sides of the Cylinder while the
knots, burrs, dirt, and imperfectly ground rags are retained within
and prevented from escaping into the Vat and are removed as occa
sion requires through a faucet of gate in the bottom of the Cylinder.

The dasher plays within half an inch
of the sides of the Cylinder and from about half an inch of the bottom
to within 4 or 5 inches of the top. The machine is to be placed at a proper
height and distance between the Stuff Chest and the Vat or imme
diately over the Vat as most convenient. The Stuff is conveyed into
the top of the Cylinder by a conductor of proper size to supply the requi
site quantity for a hand or Machine Vat whichever may be used The Cylinder is enclosed in a close square
box (having a door for convenience) which catches and secures the pulp
as it is forced through the crevices and from which it is conveyed by a
conductor at one side into the Vat. The foregoing is a description of the
dimensions of the Filtering Machine now operating at Fall Creek Paper
Mill Ithica and supplying a machine Vat which works the
stuff beat by two Engines. It is propelled from a horizontal shaft geared
in with wheels & straps connected with the machinery which ope
rates the couching machine and requires about the fifth part of a
one horse power. If the Cylinder is made of materials sufficiently
strong to prevent the crevices or bars yielding to the force of the dasher
[illegible] the Filtering Machine will [illegible] the [illegible]

6811X

309 of picking over the [illegible] paper by hand in the usual manner and this
saves a very great share of labour & expense in finishing. It will also
greatly improve the quality of paper made by machinery as it throws
the stuff into the Vat in an agitated state in which state the fibres
are drawn upon the [illegible] instead of lengthwise.
The surface is also much smoother and the
injury sustained, and the holes made in the sheets in picking with
knives is prevented.

Witnesses
Ebenezer Mack
C. T. Woodruffe

Thomas French

Exd [illegible]

1035 w.B